United States Patent Office 2,765,775
Patented Oct. 9, 1956

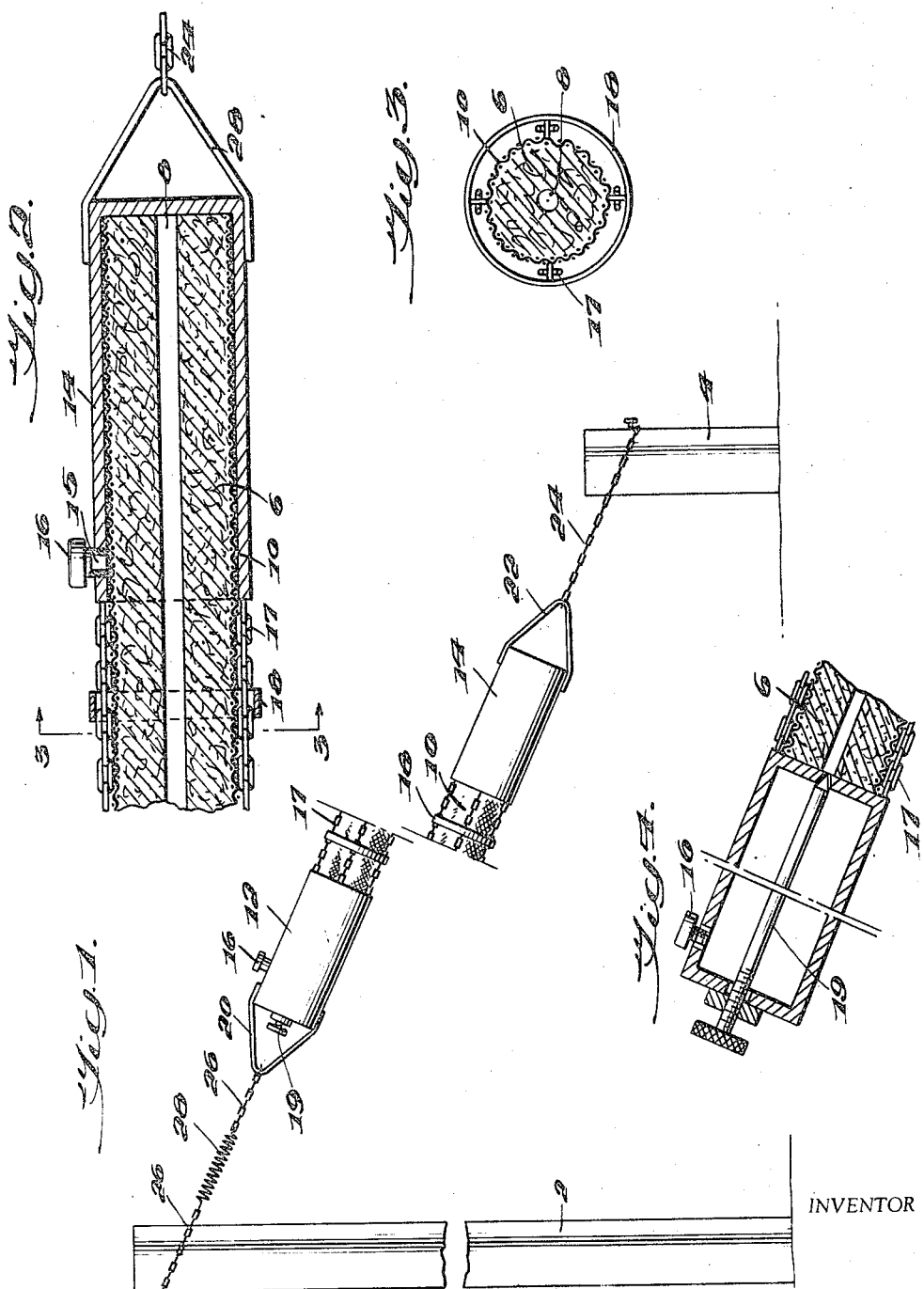

2,765,775

SUSPENDED RUBBING TYPE ANIMAL INSECTICIDE APPLICATOR

Carl Kramer, Scott City, Kans.

Application August 19, 1953, Serial No. 375,229

12 Claims. (Cl. 119—157)

The invention relates to a device for applying insecticide to livestock.

The primary object of the invention is to provide an arrangement by which livestock, in following their natural habits, actuate the applicator so as to dose their skins with insecticides.

Another object of the invention is to provide a device of this type which is simple and inexpensive, and which is formed of a small number of easily replaceable parts, yet which is at the same time rugged and durable.

A further object of the invention is to provide an arangement of this type which, when used by the animal, gives a scratching action which is pleasant to the animal, so that animals tend to use it frequently and thus to keep themselves well covered with the insecticide. When such an applicator is provided, the animals are less apt to rub against fence posts, trees, feed bunks and the like, and the incidence of skin troubles will be considerably reduced.

Further objects and advantages of the invention will appear more fully from the following description, especially when taken in conjunction with the accompanying drawings which form a part thereof.

In the drawings:

Fig. 1 shows in side elevation an applicator embodying my invention;

Fig. 2 is an enlarged cross-section through the lower end of the applicator;

Fig. 3 is a cross-section on the line 3—3 of Fig. 2, and

Fig. 4 is an enlarged cross-section through the upper end of the applicator.

The applicator is intended to be connected at different heights to two posts, such as 2 and 4, so as to occupy an inclined position high enough to allow the the animals which are to use it to pass underneath at one end but low enough to permit them to rub against the intermediate and lower parts.

The applicator proper is composed of a cylindrical body or roll 6 of felt or other absorbent material having a longitudinal central bore 8 and encased in a replaceable cover 10 of canvas or other tough and rough material. This roll has extensions at the lower end into cup or container 14, and at its upper end abuts against the bottom of cup 12. Each of these cups has a filling pipe 15 closed by a threaded cap 16 by which liquid insecticide can be introduced into the containers. The containers are connected by chains 17, secured at each end to the containers as by welding or the like and extending along the outside of the roll 6. At intervals along the roll are rings 18 of comparatively stiff metal which surround and are welded to the chains 17.

Upper container 12 has an opening in its bottom end which can be regulated by needle valve 19 which can be set to control the rate of drip of insecticide to the roll 6.

At each end, the containers have bails 20, 22, one of which, such as 22, is connected to a post by a chain 24 while the other is connected to a post by two chain sections 26 connected by a coil spring 28.

With such an arrangement, liquid insecticide can be placed in either or both of containers 12, 14 and will diffuse along the roll 6 so as to be applied to the skin of any animal which rubs against the roll. If it is placed in the upper container 12, the lower container 14 will catch and hold any excess. If, on the other hand, the lower container only is used, the insecticide is allowed to be carried by wick action along the roll.

Spring 28 has two functions. In the first place, it absorbs the shock if an animal strikes the applicator with too much force. Also, however, as animals rub against the roll, they will tend to rotate it and thus to distort spring 28. When the pressure against the roll is reduced, spring 28 will rotate the roll to its normal position, thus applying a scratching action to the skin of the animal which is pleasant to it and will cause it to return again and again, thus ensuring that the stock will receive proper amounts of insecticide.

While I have described herein one embodiment of my invention, I wish it to be understood that I do not intend to limit myself thereby except within the scope of the claims hereto or hereinafter appended.

I claim:

1. A device for applying insecticide to animals comprising an elongated member of absorbent material and means to connect each end of said member to supports at different heights thereon, said connecting means extending from the ends of the member in directions parallel to the longitudinal axis of the member and including a coil spring, and said member having a rough surface so that the member is rotated by rubbing of animals thereagainst, said spring maintaining the connecting means under tension while allowing stretching of the connecting means, said member comprising a cylindrical body of absorbent material, a plurality of rings having sharp external corners around said body spaced along the length thereof, and a plurality of flexible metallic elements extending outside of said body longitudinally thereof and connecting said rings.

2. In a device as claimed in claim 1, a reservoir for liquid insecticide at one end of said member, and means to feed insecticide from said reservoir to said member.

3. In a device as claimed in claim 2, said feeding means comprising an extension of said member into said reservoir.

4. In a device as claimed in claim 1, said rings being on the outside of said flexible elements.

5. In a device as claimed in claim 4, said flexible elements comprising chains.

6. A device for applying insecticide to animals comprising an elongated member of absorbent material and means to connect each end of said member to supports at different heights thereon, said member comprising a cylindrical body of absorbent material, a plurality of rings of rectangular cross-section around said body spaced along the length thereof, and a plurality of flexible metallic elements extending outside of said body longitudinally thereof.

7. In a device as claimed in claim 6, said rings being on the outside of said flexible elements.

8. In a device as claimed in claim 7, said flexible elements comprising chains.

9. A device for applying insecticide to animals comprising an elongated member of absorbent material and means to connect each end of said member to supports at different heights thereon, said member comprising a cylindrical body of absorbent material, a plurality of rings having sharp external corners around said body spaced along the length thereof, and a plurality of flexible metallic elements extending outside of said body longitudinally thereof and connecting said rings.

10. A device as claimed in claim 1 in which said rings are of rectangular cross-section.

11. In a device as claimed in claim 10, said rings being on the outside of said flexible elements.

12. In a device as claimed in claim 11, said flexible elements comprising chains.

References Cited in the file of this patent

UNITED STATES PATENTS

| | | |
|---|---|---|
| 1,291,367 | Barhite | Jan. 14, 1919 |
| 1,305,965 | Doty | June 3, 1919 |
| 1,705,256 | Krusi | Mar. 12, 1929 |
| 2,438,731 | Wedeking | Mar. 30, 1948 |
| 2,641,225 | Kirk | June 9, 1953 |
| 2,667,859 | Murray et al. | Feb. 2, 1954 |
| 2,669,968 | Rasmussen | Feb. 23, 1954 |
| 2,688,950 | McKinley | Sept. 14, 1954 |